United States Patent
Dolan, Jr. et al.

(10) Patent No.: US 6,317,862 B1
(45) Date of Patent: Nov. 13, 2001

(54) MODULAR PREAMPLIFIER HEAD CIRCUIT LAYOUT

(75) Inventors: Daniel J. Dolan, Jr., Cottage Grove; Scott K. Glenna, Shafer; Charles P. Jents, White Bear Township, all of MN (US)

(73) Assignee: Agere Systems Guardian Corp., Orlando, FL (US)

(*) Notice: Subject to any disclaimer, the term of this patent is extended or adjusted under 35 U.S.C. 154(b) by 0 days.

(21) Appl. No.: 09/375,828

(22) Filed: Aug. 16, 1999

Related U.S. Application Data

(60) Provisional application No. 60/133,009, filed on May 7, 1999.

(51) Int. Cl.$^7$ .............................. G06F 17/50; G06F 9/45; H01L 25/00; G11B 5/02
(52) U.S. Cl. ................ 716/8; 716/2; 716/9; 716/10; 360/46; 360/67; 360/68; 326/41; 326/47; 326/101
(58) Field of Search ................ 716/2, 8–10; 326/41, 326/47, 101; 360/46, 67, 68

(56) References Cited

U.S. PATENT DOCUMENTS

| | | | |
|---|---|---|---|
| 5,757,566 | 5/1998 | Ngo et al. ........................... | 360/67 |
| 6,058,256 | * 5/2000 | Mellen .............................. | 716/12 |
| 6,118,602 | * 9/2000 | de la Soujeole ..................... | 360/46 |
| 6,175,462 | * 1/2001 | Chung et al. ........................ | 360/67 |

OTHER PUBLICATIONS

Raumuthu, I., et al., "A design for high noise rejection in a pseudodifferential preamplifier for hard disk drives"; IEEE Journal of Solid State Circuits; vol. 35; Iss. 6; Jun. 2000; pp. 911–914.*
Fillion, R.A., "Second level assembly of chip scale, Chip–On–Flex packages", International Conference on Multichip Modules; 1997; p. 104–108.*

* cited by examiner

Primary Examiner—Matthew Smith
Assistant Examiner—Jibreel Speight
(74) Attorney, Agent, or Firm—Kinney & Lange P.A.

(57) ABSTRACT

A preamplifier chip for a disk drive is modular in layout. Twelve head cells for the preamplifier chip are not lined along the periphery of the chip, but rather are disposed in an array including four rows of three head cells each. The rows are all directed perpendicular to the side with control connection pads. The preferred embodiment allows for a smaller preamplifier chip through increasing the density of head cells on the chip relative to the periphery of the chip usable for head cell connection. The array spaces write portions of the head cells in four spaced lines, minimizing problems associated with heat build up. Spacing between rows of the array can be determined to take maximum advantage of lead pitch on the flex circuit. Modification of the design to a chip for eight or four channels is possible with minimal changes to the design, and minimal reworking of the common circuitry.

18 Claims, 6 Drawing Sheets

MODULAR PREAMPLIFIER HEAD CIRCUIT LAYOUT

CROSS-REFERENCE TO RELATED APPLICATION(S)

The present application claims priority from application Ser. No. 60/133,009, filed May 7, 1999, entitled "MODULAR PREAMPLIFIER HEAD CIRCUIT LAYOUT.

BACKGROUND OF THE INVENTION

The present invention relates to preamplifiers for use in disk drives, and, more particularly, to the layout of attachment pads on the preamplifier used in attaching the preamplifier to a flex circuit for electrically connecting head cells in the preamplifier to the heads.

Preamplifiers have long been used in the manufacture of disk drives. The preamplifier chip is often fabricated as a separate component, and then placed into the disk drive for subsequent attachment via electrical connections to both upstream such as to a power supply and downstream such as to the read-write head. To facilitate electrical connection of the preamplifier chip, preamplifier chips typically have a number of metallic attachment pads or bond pads. Each bond pad provides a separate attachment location to an electrically conductive lead. For instance, in MR heads, each read-write head may require four separate electrical leads. The preamplifier chip may accordingly include four bond pads per head, for connection downstream to each of the leads for each head. The preamplifier chip may also include a number of leads for upstream connection, such as for voltage sources and outputs. The upstream leads are common for all of the heads, and are known as "control" leads.

Typically, preamplifier chips are rectangular and include control bond pads along one side. Bond pads along the remaining three sides are devoted to the head cells.

As disk drives become smaller and smaller, the real estate provided for the preamplifier chip is at an increasing premium. It is desired to make the preamplifier chip as small as possible, while still permitting enough space for bond pads to all of the necessary inputs and outputs. Space constraints are particularly important as the number of heads used in the disk drive and driven by the preamplifier chip increases. For instance, if four bond pads are used for each head, a four-head (two disks) circuit requires only sixteen pads devoted for the head cells. A twelve head arrangement (six disks) requires forty-eight pads for the head cells to be driven by a single preamplifier chip.

As the number of disks/heads in a disk drive increases and as size decreases, the placement of the bond pads on the preamplifier chip becomes increasingly important. Better designs and systems for attaching a preamplifier circuit within a disk drive are needed.

BRIEF SUMMARY OF THE INVENTION

The present invention is a preamplifier chip for a disk drive which is modular in layout. As in prior art designs, the preamplifier chip may include control connection pads along one side of the chip. The head cells for the preamplifier chip of the present invention are not lined along the remaining periphery, but rather are disposed in an array including rows. The rows are all directed perpendicular to the side with control connection pads. In the preferred embodiment, the array including rows allows for a smaller preamplifier chip through increasing the density of head cells on the chip relative to the periphery of the chip usable for head cell connection.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
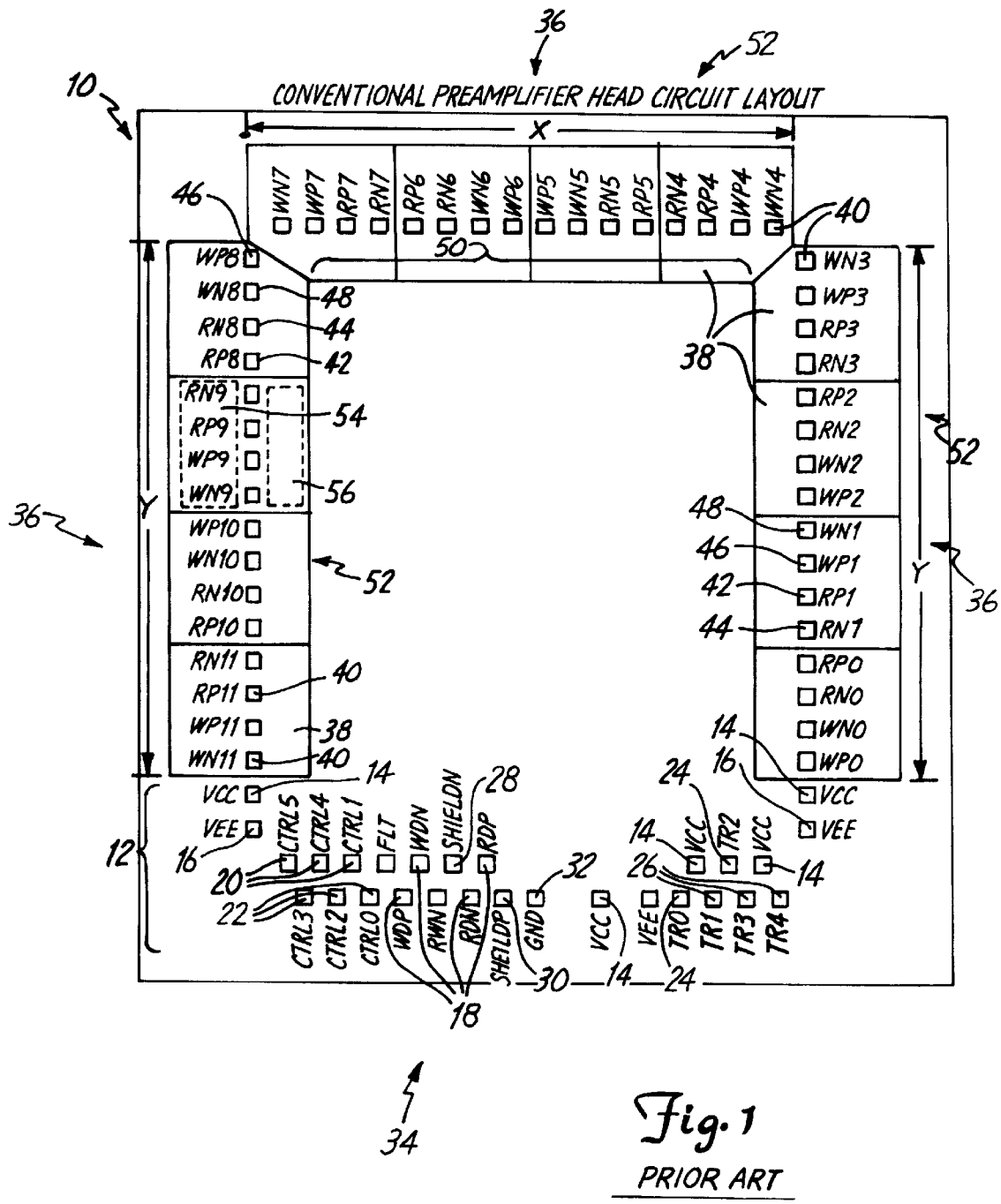
FIG. 1 is a plan view of a prior art preamplifier chip.

FIG. 1 shows an exemplary prior art preamplifier head circuit layout 10. The prior art preamplifier circuit 10 has a total x-direction length of about 0.20 inches, and a total y-direction width of about 0.22 inches. The preamplifier circuit 10 includes a number of control pads 12 devoted for upstream attachment to the disk drive. For instance, the design of FIG. 1 includes some twenty-eight control pads 12 devoted for common inputs and outputs. These may include several control power inputs such as constant current 14 and constant voltage 16, signal outputs 18, control inputs 20 and outputs 22, testing inputs 24 and outputs 26, shield inputs 28 and outputs 30, grounds 32, etc. These control pads 12 are typically situated along a first side 34 of the preamplifier chip 10.

The remaining three sides 36 of the prior art circuit layout 10 are devoted for downstream connection of the preamnplifier chip 10 to the heads. The design of FIG. 1 includes some forty-eight pads disposed in twelve head cells 38, for connection to twelve heads of the disk drive. Each head cell 38 includes a line of four bond pads 40. The four bond pads 40 include a positive read bond pad 42, a negative read bond pad 44, a positive write bond pad 46 and a negative write bond pad 48, ordered as convenient for connection to the head. The preamplifier chip 10 is accessible from three sides for attachment of a flex circuit (not shown) to the bond pads 40, the flex circuit containing leads which communicate at their opposite end with the head.

With twelve head cells 38 (twelve channels or heads, six disks) used and three sides of the preamplifier chip 10 available, the head cells 38 are positioned four per side 36. Each of the remaining three head connection sides 36 of the preamplifier chip 10 thus includes four heads cells 38, or sixteen pads 40. The forty-eight pads 40 have a pitch of about eight mils per pad. The prior art preamplifier chip 10 has an x-direction length for head cells 38 numbered 4–7 of about 128 mils, with the x-dimension of rows for head cells 38 numbered 0–3 and 8–11 taking up about another 35 mils each. The y-direction width for head cells 38 numbered 0–3 and 8–11 is about 128 mils. Control pads 12 take up about another 55 mils of y-direction width, and head cells 38 numbered 4–7 take up about another 35 mils. Common circuitry 50 is located on the inside of the peripheral lines of head cells 38. Each of the three rows of head cells 38 take up about 128 mils. The rectangular usable periphery 52 of the chip 10, defined as the total length along the three sides available for head pads 40 (i.e. 2y+x), is about 0.384 inches.

Each head cell 38 includes a write portion 54 and a read portion 56 on opposing sides of its line of bond pads 40. During operation, the disk drive typically has only one portion of one head cell 38 active. Due to the magnitude of current involved, an active write portion 54 generates considerably more heat than an active read portion 56. Heat or temperature build-up in the preamplifier chip 10 can be detrimental to circuit performance. The head cells 38 are oriented such that the write portions 54 are outward toward the periphery 52 of the chip 10. This orientation allows peripheral dissipation of the heat generated when a write circuit 54 is in use. The heat generated by the write portion 54 is located along the periphery 52 of the chip 10, and circuitry 50 on the chip interior is thermally insulated from the write portions 54 by the line of bond pads 40 as well as the line of read portions 56.

Figure 2:
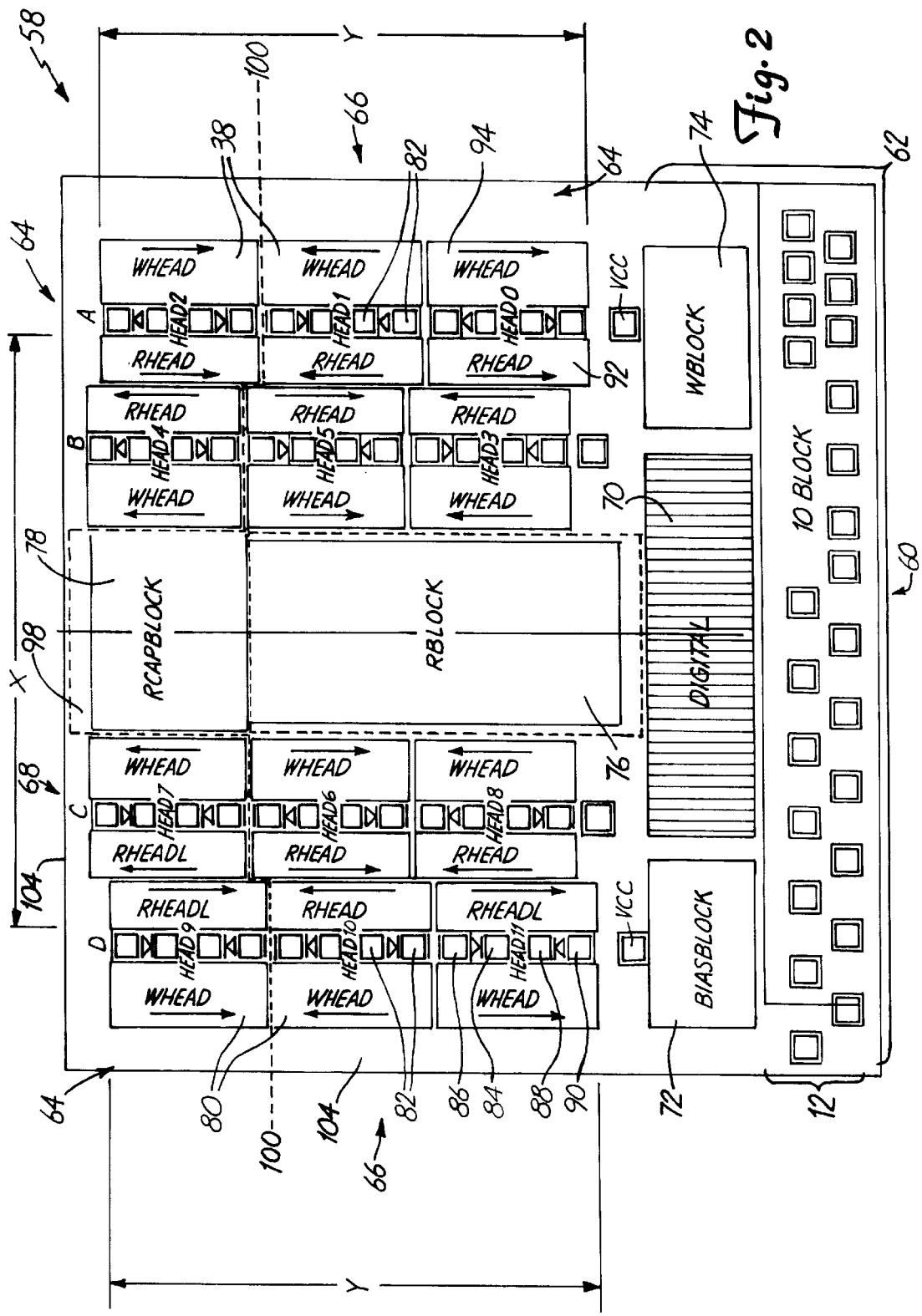
FIG. 2 is a plan view of a preamplifier chip according to the present invention.

FIG. 2 shows a preamplifier chip 58 according to the present invention. Control pads 12 are disposed on a first side 60 of the chip 58 as known in the art. With advances in circuit design and fabrication technology, the space required for common circuitry 62 is being made smaller and smaller. The preferred preamplifier chip 58 has overall x and y dimensions of about 0.20×0.15 inches. The preamplifier chip 58 is thus smaller than the prior art layout 10, despite having the same channel count and driving the same number of heads.

Control pads 12 take up all of one side 60 of the chip 58. About 96 mils of usable periphery 64 is available on two y sides 66 of the chip 58, and about 148 mils of usable periphery 64 is available on the x side 68 of the chip 58 opposite the control pads 12, for a total three-side usable periphery 64 of about 0.340 inches.

Most of the common circuitry 62 is located on the preamplifier chip 58 in the same general location as the control pads 12, that is immediately around or underneath the control pads 12. The chip 58 is fabricated on a substrate or wafer, with the circuitry 62 three-dimensionally defined as known in the art in approximately twenty photolithographically defined layers which may include metal layers, insulator layers, transistor layers, etc.

The preferred common circuitry 62 may include a digital block 70, a bias block 72, a write block 74, a read block 76 and a capacitor block 78. The chip 58 design may, for example, include a direct AC-coupled amplifier in accordance with the teachings of U.S. Pat. No. 5,757,566 to Tuan V. Ngo and Craig M. Brannon, incorporated herein by reference. That patent describes emitter-follower circuits connected to magnetoresistive heads with the emitter-follower circuits connected through AC-coupling capacitors to a differential amplifier. The AC-coupling capacitors are rather large capacitors for AC-coupling and DC-blocking of signals between the emitter followers and the amplifier. The preferred capacitor block 78 is dedicated to the AC-coupling capacitors. Numerous other arrangements and divisions of common circuitry can alternatively be used.

Head cells 80 of the chip 58 are disposed in an array of (a×b=n) head cells 80. In the preferred embodiment, the array includes four lines or rows of three head cells 80 each, for a total of twelve head cells 80. Each head cell 80 includes a line of four bond pads 82 on a surface of the chip 58 for connection to the read/write head (not shown). The four bond pads 82 include a positive read bond pad 84, a negative read bond pad 86, a positive write bond pad 88 and a negative write bond pad 90, ordered as convenient for connection to the head. It will be appreciated that a considerable amount of real estate on the surface of the chip 58 is dedicated to head cells 80 and connection pads 82.

Each of the head cell rows (A,B,C,D) are oriented such that the lines of bond pads 82 are directed generally perpendicular to the side 60 of the chip 58 devoted for control pads 12. A read portion 92 of the head cell 80 is fabricated on one side of the line of bond pads 82, and a write portion 94 of the head cell 80 is on the other side of the line of bond pads 82. Alternatively, if desired the four bond pads may be positioned in other orientations in the head cell and relative to the read portions and write portions.

Each bond pad 82 is a square, such as about 4×4 mils. Spaces separating adjacent bond pads 82 are also about 4 mils. The 8 mil pitch is about as tight as practicable with present assembly methods to ensure accurate attachment to separate leads 96 (shown in FIG. 3) of a flex circuit with minimal possibility of shorting. Larger bond pads with greater spacing will lead to easier assembly and less possibility of shorting between adjacent bond pads, but only at the cost of additional real estate. As assembly methods improve, the preferred size, shape and spacing of bond pads 82 may change to accommodate such improvements.

The four rows of head cells 80 include two rows (A,B) on one side and two rows (C,D) on the other, separated by a central space 98. The central space 98 is used for some of the common circuitry 62. In the preferred embodiment, the central space 98 is about 58 mils in the x-direction and about 120 mils in the y-direction, and houses the common read block 76 and the capacitor block 78. A cutoff line 100 between the read block 76 and the capacitor block 78 generally coincides with the cut-off 100 between the first head cell 80 (numbered 2, 4, 7, and 9) in each row (A,B,C,D) and the remaining head cells 80 in each row (A,B,C,D).

The write portions 94 of the head cells 80 in the first rows (A,D) are oriented toward the outside, whereas the write portions 94 of the head cells 80 for the second and third rows (B and C, respectively) are directed toward the inside. This orientation provides four spaced lines of write portions 94.

The arrangement of the present invention provides several advantages. While the amount of heat created depends upon the circuits of the head cells 80, the present layout of head cells 80 minimizes build-up of heat. None of the write head cell portions 94 are located adjacent and back-to-back with other write portions 94. The four spaced lines of write portions 94 provide four spaced lines of primary heat generation. Spacing between write portions 94 is important particularly for the write processes employed during manufacture and initialization of the disk drive. In contrast to consumer use of the disk drive when only one write head is active at any given time, multiple write heads may be active simultaneously during manufacture of the disk drive. The present invention provides spacing between write portions 94 to minimize heat build-up, and thereby maintain temperature during initialization in all active head cells 80 to less than about 120° C.

Each of the read portions 92 of the head cells 80 are spaced from any of the heat generation lines by at least the distance of one line of connection pads 82. This orientation thermally and electrically separates or isolates the read portion 92 of each head cell 80 from the write portion 94 with the space provided by the line of bond pads 82. Good thermal and electrical isolation between the read portion 92 and the write portion 94 of the head cells 80 improves data density, because write to read (and read to write) transitions can be made more quickly resulting in a smaller data transition size.

Figure 3:
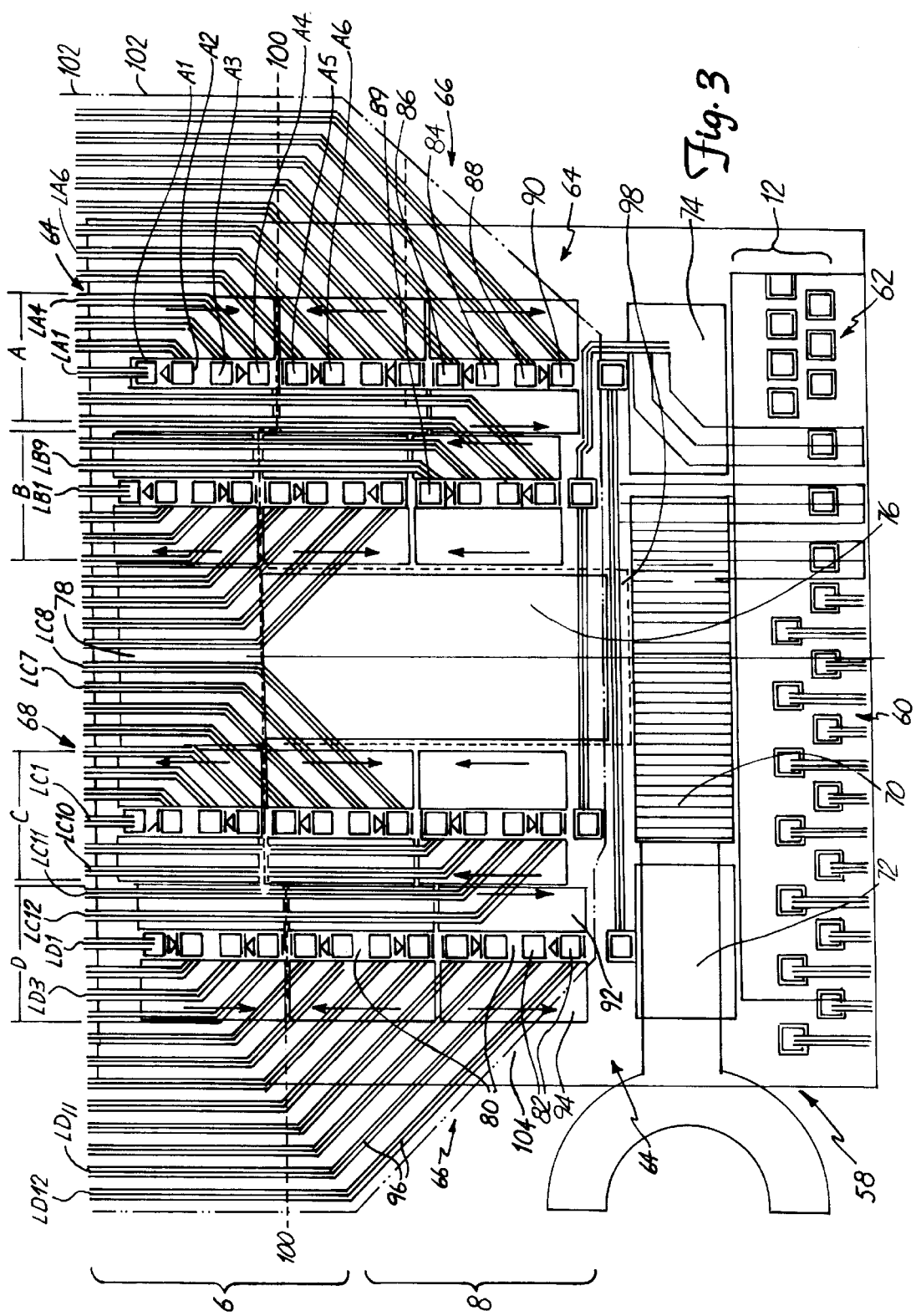
FIG. 3 is a plan view of the preamplifier chip of FIG. 2 showing connection to a flex circuit.

The circuit layout 58 provides benefits in attachment of a flex circuit 102, shown in FIG. 3. The attachment of the flex circuit 102 is performed as known in the art, through any of thermal, sonic and pressure welding or joining leads 96 in the flex circuit 102 to the bond pads 82.

Leads 96 in the flex circuit 102 are spaced at a pitch specified by the ultimate disk drive manufacturer. For instance, each lead 96 in the preferred flex circuit 102 is about 3 mils wide, and is spaced at least about 3 mils away from the nearest adjacent lead 96, for a pitch of about 6 mils per lead 96. Each lead 96 must also be adequately spaced from the closest neighboring bond pad 82, such as with a 3 mil spacing.

The flex circuit 102 is preferably formed with a single metal layer on an electrically insulative substrate 104, as known in the flex circuit art. Formed of a single metal layer, none of the leads 96 can overlap with any other leads 96.

In the preferred embodiment, the first and fourth rows (A and D, respectively) of head cells 80 have the minimum spacing between them allowable based upon the requirements of the lead pitch. That is, with a minimum lead pitch of 6 mils and twelve bond pads 82 located in both the second and third rows (B and C, respectively), the leads 96 for the second and third rows (B and C respectively) require about 6×24=0.144 inches. Because the leads 96 must also provide adequate clearance from the bond pads 82 in the second and third rows (B and C, respectively), about 4 more mils are needed, such that the bond pads 82 for the first and fourth rows (A and D, respectively) are spaced about 0.148 mils apart.

Leads 96 for two of the head cells 80 of the second and third rows (i.e., head cells 80 numbered 4–7) arc directed inward. Leads 96 for the last head cell 80 in each of the second and third rows (B and C respectively) (i.e., head cells 80 numbered 3 and 8) are directed outward between the adjacent rows (C, D and A,B) of bond pads 82. Leads 96 for the first and fourth rows (A and D) of head cells 80 (i.e., head cells 80 numbered 0–2 and 9–11) are each directed outward, before they are turned to head (upward in FIG. 3) in the parallel direction of the flex circuit 102. The orientation and numbering of head cells 80 shown thus results in leads 96 in the flex circuit 102 which are numbered in series from 0 to 11.

The illustrated orientation of leads 96 results in four leads 96 ($L_{c9}$, $L_{c10}$, $L_{c11}$, and $L_{c12}$ or $L_{B9}$, $L_{B10}$, $L_{B11}$, and $L_{B12}$) running between adjacent rows (C and D or A and B) of bond pads 82. This four lead separation is appropriate when the read portions 92 are correspondingly sized. If the read portion 92 are made a different size, it may be desired to run fewer or more leads 96 between the adjacent rows (A,B and C,D) of bond pads 82. The number of leads 96 between adjacent rows (A,B and C,D) of bond pads 82 can be selected as desired by appropriate orientation of the bond pads 82 and leads 96 on the first head cell 80 in the second and third rows (B and C) (i.e., head cells 80 numbered 4 and 7). The lead 96 ($L_{B1}$, $L_{c1}$)for the first bond pad 82 (B1 or C1) in the row (B or C) is directed straight outward, but the leads 96 for the second, third and/or fourth bond pad 82 (B2–B4 and) in each row (B or C) may be directed to either side of the lead 96 for the first bond pad 82 (B1, C1 or D1). For instance, if the desired spacing between adjacent lines of bond pads 82 corresponds to five leads 96, then one lead 96 (one of $L_{B2}$–$L_{B4}$ or $L_{C2}$–$L_{C4}$) for the first head cell 80 (i.e., head cells 80 numbered 4 and 7) is directed outward, to join the four leads 96 ($L_{B9}$–$L_{B12}$ or $L_{C9}$–$L_{C12}$) from the last head cell 80 (i.e., head cells 80 numbered 3 and 8) between adjacent lines of bond pads 82. If the size of read portion 92 corresponds to only two leads 96, then leads 96 ($L_{B2}$–$L_{B4}$ or $L_{C2}$–$L_{C4}$) for the first head cell 80 (i.e., head cells 80 numbered 4 and 7) are split with one lead 96 directed inward and two leads 96 directed outward between the adjacent rows of bond pads 82. The leads 96 ($L_{B5}$–$L_{B12}$ or $L_{C5}$–$L_{C12}$) for the remaining head cells 80 (i.e., head cells 80 numbered 3 and 5, and head cells 80 numbered 6 and 8) are all directed inward. In all these configurations, all the leads 96 ($L_{A1}$–$L_{A4}$, $L_{B1}$–$L_{B4}$ or $L_{C1}$–$L_{C4}$ or $L_{D1}$–$L_{D4}$) for the first head cell 80 (i.e., head cells 80 numbered 4 and 7) remain next to each other, albeit in a different order. However, the sequence or identity of head pads 82 (i.e., write positive, write negative, read positive, read negative) for the first head cell 80 can be correspondingly modified in fabrication of the chip 58. Thus, any spacing between adjacent rows of bond pads 82 can be accommodated while keeping all the leads 96 for each head cell 80 next to each other and in the desired sequence.

It will be understood that the density of bond pads 82 on the chip 58 exceeds usable space (2y+x) on the remaining three sides 66,68 of the rectangular usable periphery 64 of the chip 58. In particular, with a total of n=12 head cells 80 on the chip 58, there are a total of 4n=48 bond pads 82 devoted to the head cells 80. With a minimum spacing per bond pad 82 of eight mils, use of the prior art peripheral layout of head cells 38 mandates a usable periphery 52 of 48×8=0.384 inches, i.e., 128 mils on each of three sides (36). As discussed above, the usable periphery 64 of the preferred embodiment is only (2×0.96)+0.148=0.340 inches. This increase in density is achieved with the present invention because the second and third rows (B and C) of head cells 80 are oriented perpendicular to their leads 96, and because the leads 96 for the second and third rows (B and C) of heads cells 80 are spaced more densely (6 mil pitch) than the bond pads 82 in the second and third rows (B and C) of head cells 80 (8 mil pitch).

The layout of the flex circuit 102 minimizes the length of the leads 96. The leads 96 in the flex circuit 102 have a parallel path section 106 and angled path sections 108. The preferred angle is about 45° relative to the parallel path section 106, although other angles may also be used. For substantially all of its length, each lead 96 is directed toward its bond pad 82 with a minimal straight-line distance.

Figure 4:
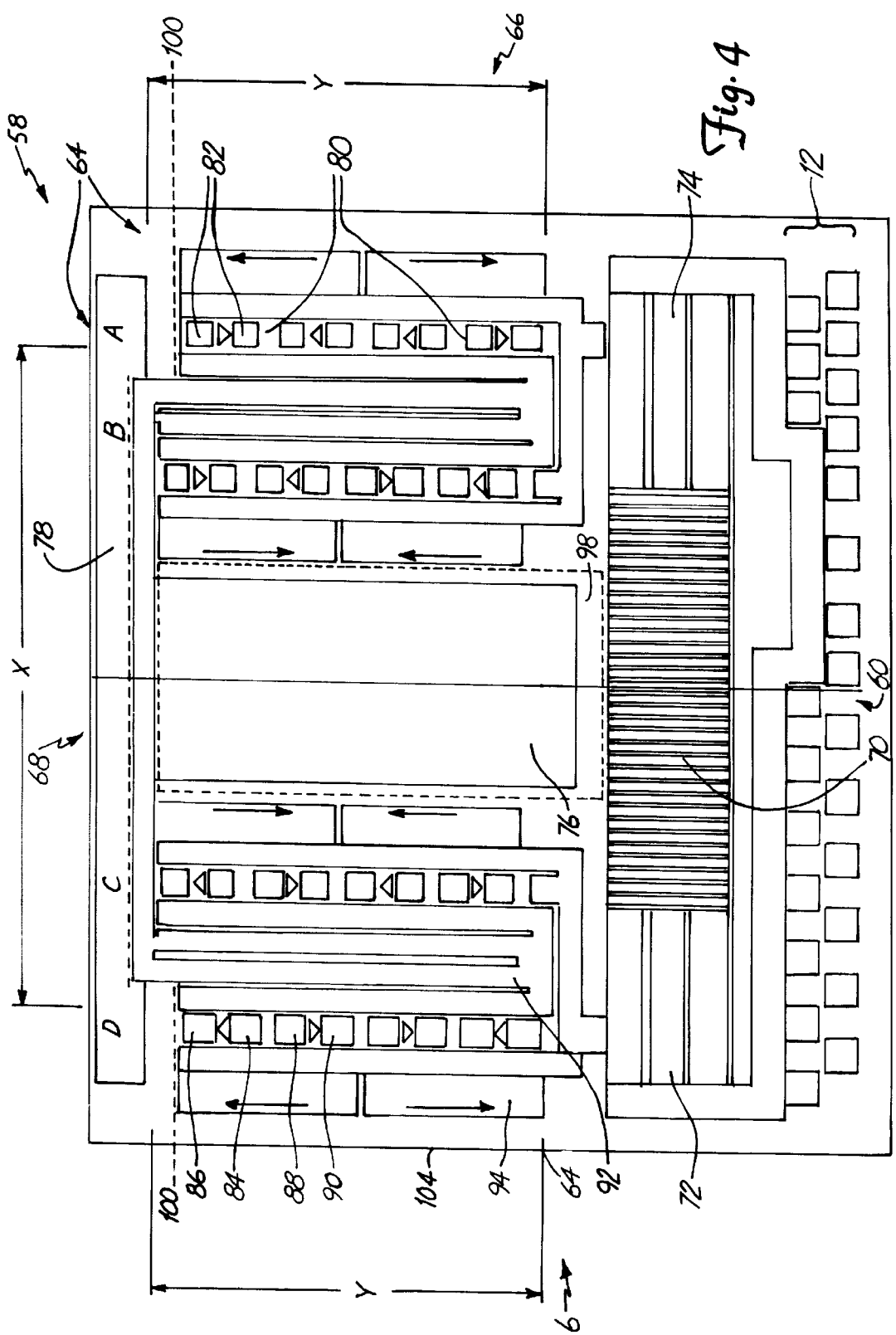
FIG. 4 is a plan view of the preamplifier chip of the present invention modified for eight heads.
Figure 5:
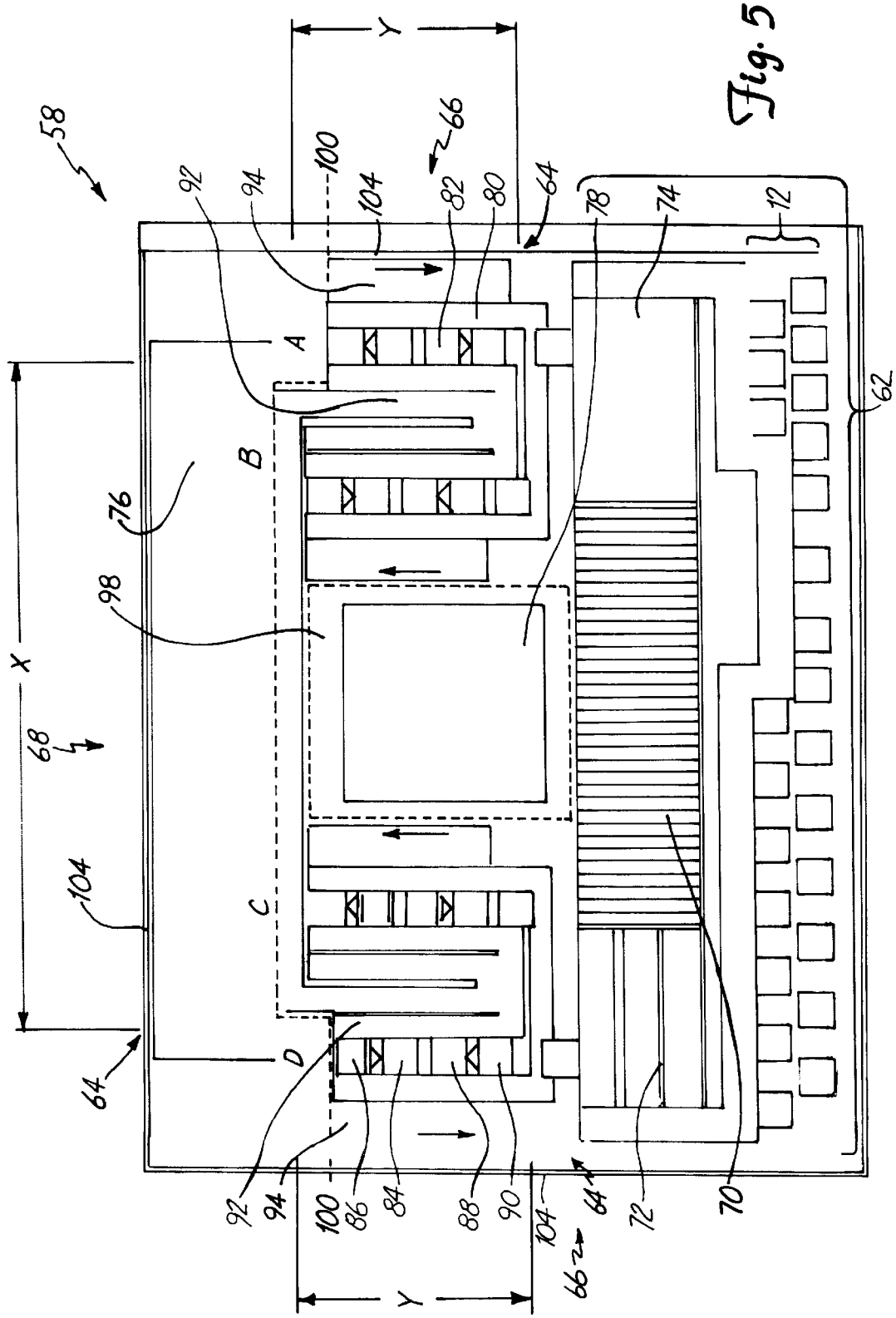
FIG. 5 is a plan view of the preamplifier chip of the present invention modified for four heads.

A major benefit of the present invention is in improved modularity, further illustrated with respect to FIGS. 4 and 5. FIG. 4 shows the preferred preamplifier chip 58 modified for eight heads, and FIG. 5 shows the preferred preamplifier chip 58 modified for four heads. The chip 58 designs of FIGS. 2, 4 and 5 thus represent a single design family, allowing for channel count variations of twelve, eight and four channels.

As shown by a comparison of FIGS. 2 and 4, the change in channel count from twelve to eight channels has resulted in no change or modification to the digital block 70, the bias block 72, the write block 74 or the read block 76, and in no change to the control pads 12. The four head blocks 80 beyond the cut-off line 100 (i.e., head cells 80 previously numbered 2, 4, 7 and 9) have been removed, but the retained head cells 80 (which are redesignated for eight disks) are unmodified. The only modification to the common circuitry 62 is rearranging the capacitor block 78 which was located beyond the cut-off line 100. The capacitor block 78 is rearranged into a narrower space, so the y side 66 of the rectangular substrate 104 can be shortened.

As shown by a comparison of FIGS. 2 and 5, the change in channel count from twelve to four channels has resulted in no change or modification to the digital block 70, the bias block 72 or the write block 74, and in no change to the control pads 12. Eight head cells 80 have been removed, but the retained head cells 80 (i.e., head cells 80 previously numbered 0, 3, 8 and 11, which are redesignated for the four disk surfaces) are unmodified. The capacitor block 78 is moved to a position in the central space 98 between the second and third rows (B and C) of head cells 80, but not otherwise modified. The read block 76 is moved and rearranged into a narrower space, again so the y side 66 of the rectangular substrate 104 can be shortened.

The present invention reduces the time and difficulty involved in producing multiple channel count variation preamplifier chips 58 from the same design family. Chip 58 layout does not need to be substantially modified for alteration of the number of disks, and hence the number of heads supported by the chip 58. Instead, reworking the chip 58 to accommodate eight or four disk surfaces (instead of twelve) as shown in FIGS. 4 and 5, is accomplished at the CAD level by eliminating four or eight of the head cells 80 in the 4×3 array, while still maintaining symmetry of the layout. Conversely, in the prior art illustrated in FIG. 1, a substantial amount of rework of the layout is required to alter the number of head cells 38 from twelve to eight to four and still maintain symmetry of the pad design on the chip.

Figure 6:
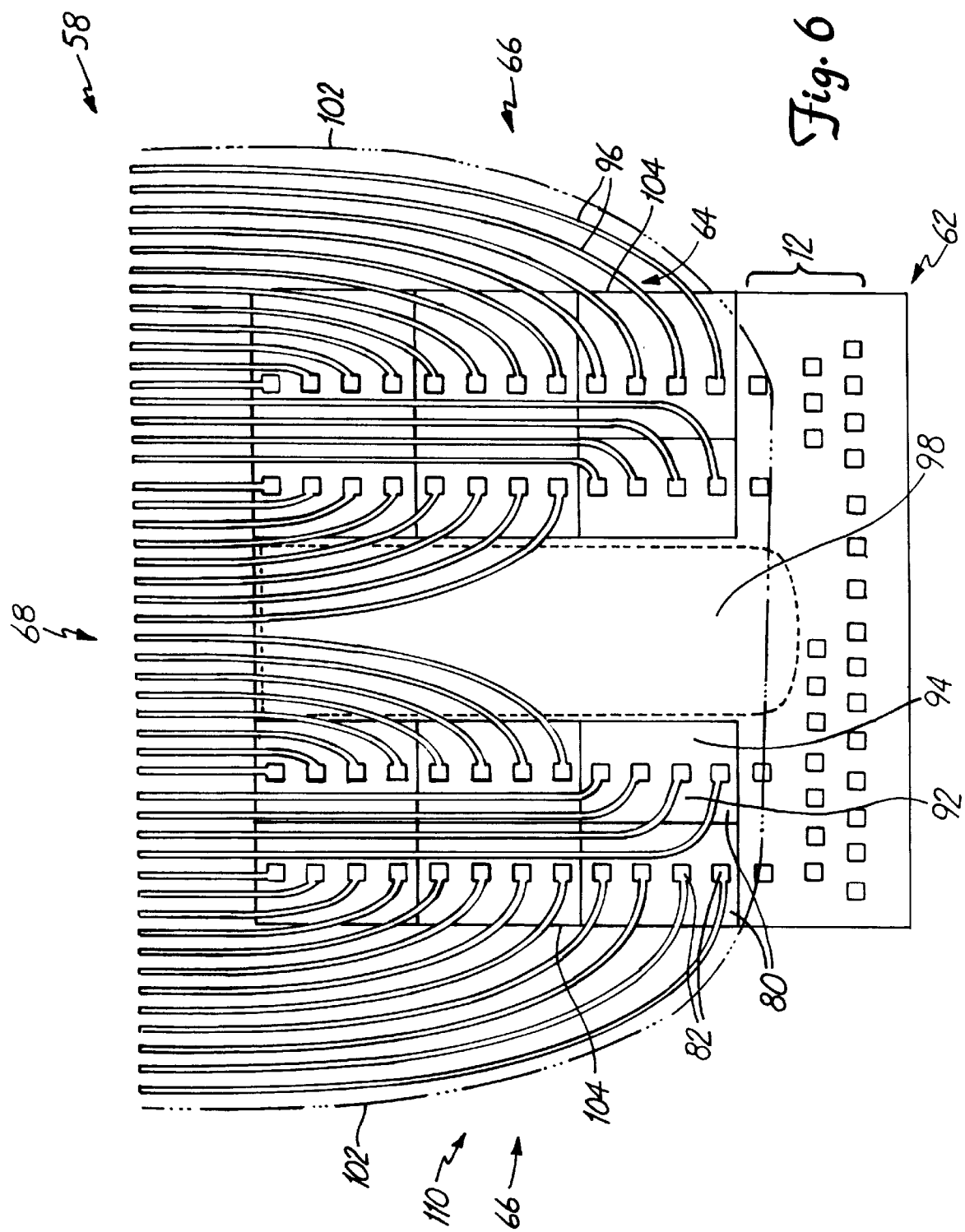
FIG. 6 is a plan view of an alternative preamplifier chip according to the present invention.

FIG. 6 shows an alternative embodiment the present invention. In the circuit layout of FIG. 6, the bias block 72, the digital block 70 and the write block 74 are fabricated smaller such as under the control pads 12 or in the central space 98, and do not require separate real estate on the chip 104. Despite having a very small chip 104, all forty-eight bond pads 82 and leads 96 are accommodated in the 4×3 array of head cells 80 with bond pads 82 oriented in perpendicular lines to the control side 60. The leads 96 in the flex circuit 102 are further fabricated to include curved forms 110. While the curved forms 110 are more detailed to fabricate in the flex circuit 102, they further shorten the length of the leads 96.

Although the present invention has been described with reference to preferred embodiments, workers skilled in the art will recognize that changes may be made in form and detail without departing from the spirit and scope of the invention.

What is claimed is:

1. A modular preamplifier chip for a disk drive, comprising:
   a substrate;
   head cells on the substrate, each head cell comprising:
      read signal processing circuitry terminating in read connection pads; and
      write signal processing circuitry terminating in write connection pads;
   wherein the head cells are disposed in a first row of a plurality of head cells and a second row of a plurality of head cells immediately adjacent and parallel to the first row.

2. The modular preamplifier chip of claim 1, wherein the read signal processing circuitry is disposed on a read side of each head cell and the write signal processing circuitry disposed on a write side of each head cell opposite the read side.

3. The modular preamplifier chip of claim 2, wherein the head cells in the first row are oriented to have their read side disposed toward the second row and the head cells in the second row are oriented to have their read side disposed toward the first row.

4. The modular preamplifier chip of claim 2, wherein the read connection pads and the write connection pads of each head cell are disposed in a connection pad row thermally separating the read side from the write side.

5. The modular preamplifier chip of claim 2, wherein the read connection pads and the write connection pads of each head cell in the first row are disposed in a first connection pad row, and wherein the read connection pads and the write connection pads of each head cell in the second row are disposed in a second connection pad row parallel to the first connection pad row.

6. The modular preamplifier chip of claim 1, further comprising head cells disposed in a third row of a plurality of head cells parallel to the first and second rows and a fourth row of a plurality of head cells immediately adjacent and parallel to the third row.

7. The modular preamplifier chip of claim 6, wherein the read signal processing circuitry is disposed on a read side of each head cell and the write signal processing circuitry disposed on a write side of each head cell opposite the read side.

8. The modular preamplifier chip of claim 7, wherein:
   the head cells in the first row are oriented to have their read side disposed toward the second row;
   the head cells in the second row are oriented to have their read side disposed toward the first row;
   the head cells in the third row are oriented to have their read side disposed toward the fourth row; and
   the head cells in the fourth row are oriented to have their read side disposed toward the third row.

9. The nodular preamplifier chip of claim 8, wherein the first row and the fourth row run along opposing parallel edges of the preamplifier chip.

10. The modular preamplifier chip of claim 9, wherein the second row is spaced from the third row by common circuitry, such that all four rows of write sides of head cells are spaced across the modular preamplifier chip.

11. The modular preamplifier chip of claim 1,
   wherein the substrate has a rectangular usable periphery with a length x and a width y, the rectangular usable periphery having one side of length x devoted to control pads and having a remaining three sides having usable space of x +2y;
   wherein there are a total number n of head cells on the substrate, each head cell having two read connection pads and two write connection pads for a total of 4n connection pads;
   each connection pad having a minimum distance d to the closest adjacent connection pad;
   wherein the density of read and write connection pads on the chip exceeds usable space on the remaining three sides of the rectangular usable periphery, 4n x d>x+2y.

12. A preamplifier chip and flex circuit connection for a disk drive, comprising:
   a substrate having a periphery with four sides;
   head cells on the substrate, each head cell comprising:
      read signal processing circuitry terminating in read connection pads; and
      write signal processing circuitry terminating in write connection pads; and
   a flex circuit connection for the head cells, the flex circuit connection containing a lead for each of the read connection pads and write connection pads, all of the leads formed in a single layer such that none of the leads overlap, adjacent leads having a minimum lead pitch;

wherein the head cells are disposed in:
- a first outside row of a plurality of head cells along a first of the sides of the substrate;
- a second outside row of a plurality of head cells along a second of the sides of the substrate, the second side being parallel to and opposite the first side; and
- inside head cells disposed on the substrate between the first outside row and the second outside row;

wherein all of the leads for the connection pads on the inside head cells extend on the flex circuit between the first outside row and the second outside row;

wherein connection pads of the first outside row are spaced from connection pads of the second outside row by a distance approximately equal to the minimum lead pitch multiplied by the total number of leads to connection pads on the inside head cells.

13. The preamplifier chip of claim 12, wherein the minimum lead pitch is about 6 mils.

14. The preamplifier chip of claim 12 wherein each of the connection pads is spaced from a closest adjacent connection pad by a minimum connection pad pitch which exceeds the minimum lead pitch.

15. The preamplifier chip of claim 14, wherein the minimum connection pad pitch is about 8 mils.

16. The preamplifier chip of claim 12, wherein the inside head cells comprise a first inside row of a plurality of head cells, the first inside row extending parallel to the first and second outside rows, wherein some of the leads for the connection pads on the first inside row extend between the first inside row and the first outside row and others of the leads for the connection pads on the first inside row extend between the first inside row and the second outside row.

17. A method of designing a family of preamplifier chip designs, comprising:

designing a first modular preamplifier chip in the family, the first modular preamplifier chip design having preamplifier circuitry on a rectangular substrate of length x and width y, the preamplifier circuitry having control pads on one side of length x of the substrate, the preamplifier circuitry having an array of a plural number a of parallel rows of head cells with a plural number b head cells in each row, for a total number n=a×b of head cells in the first modular preamplifier chip design, the rows extending perpendicular to the control pads;

defining a cut-off line between a first head cell and remaining head cells from each of the rows of head cells altering the first modular preamplifier chip design into a second modular preamplifier chip design, the altering act comprising:
- removing each of the first head cells beyond the cut-off line from the first modular preamplifier chip design, for a total number n=a(b−1) of head cells in the second modular preamplifier chip design;
- retaining all preamplifier circuitry before the cut-off line including the remaining head cells unmodified; and
- shortening the width y of the rectangular substrate.

18. The method of claim 17, further comprising:

rearranging preamplified circuitry not devoted to a particular head cell and located beyond the cut-off line into a narrower space so the width y of the rectangular substrate can be shortened.

* * * * *